United States Patent
Aoki et al.

(10) Patent No.: US 6,549,601 B1
(45) Date of Patent: Apr. 15, 2003

(54) MOUNTING METHOD FOR CORE INTERNALS

(75) Inventors: Masataka Aoki, Hitachi (JP); Junichi Kawahata, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/623,107

(22) PCT Filed: Sep. 17, 1999

(86) PCT No.: PCT/JP99/05066

§ 371 (c)(1),
(2), (4) Date: Aug. 29, 2000

(87) PCT Pub. No.: WO01/22429

PCT Pub. Date: Mar. 29, 2001

(51) Int. Cl.$^7$ ................................................ G21C 19/20
(52) U.S. Cl. ......................... 376/260; 376/308; 376/372
(58) Field of Search ................................ 376/260, 308, 376/372

(56) References Cited

U.S. PATENT DOCUMENTS

| | | | |
|---|---|---|---|
| 4,409,179 A | * 10/1983 | Burger | 376/302 |
| 5,392,322 A | * 2/1995 | Whitling et al. | 376/260 |
| 5,583,899 A | * 12/1996 | Relf | 376/287 |
| 5,600,686 A | * 2/1997 | Stoss | |
| 5,600,690 A | * 2/1997 | Weems et al. | 376/302 |
| 5,659,590 A | * 8/1997 | Relf | |
| 5,687,206 A | * 11/1997 | Scmidt et al. | |
| 5,793,828 A | * 8/1998 | Wivagg et al. | 376/260 |
| 5,828,713 A | * 10/1998 | Schmidt et al. | 376/260 |
| 5,970,109 A | * 10/1999 | Meire-Hynek et al. | |
| 6,009,137 A | * 12/1999 | Matsumoto et al. | 376/302 |
| 6,198,787 B1 | * 3/2001 | Hasegawa et al. | |

FOREIGN PATENT DOCUMENTS

| | | | |
|---|---|---|---|
| JP | 62-185198 | * 8/1987 | |
| JP | 6-281776 | 10/1994 | G21C/5/10 |
| JP | 8-152495 | 6/1996 | G21C/19/02 |
| JP | 8-233972 | 9/1996 | G21C/13/00 |
| JP | 8-152495 | * 11/1996 | |
| JP | 10-132985 | 5/1998 | G21C/19/02 |

OTHER PUBLICATIONS

Corso Europa 13 Milano, Nov. 1973, Nuclear Engineering International, p. 858.*

* cited by examiner

Primary Examiner—Michael J. Carone
Assistant Examiner—John Richardson
(74) Attorney, Agent, or Firm—McDermott, Will & Emery

(57) ABSTRACT

An old core shroud (11) and an old jet pump (16) received in a reactor pressure vessel (1) are cut and carried out. A module of core internals having a new core shroud (N11), a new jet pump (N16) and a new baffle plate (N29) integrated is carried into the reactor pressure vessel (1) in which an old baffle plate (28) and an old shroud support cylinder (13) welded and fixedly secured to the reactor pressure vessel (1), and an old shroud support leg (12) fixedly secured to said old baffle plate (28) and said old shroud support cylinder (13) are left. Then, the new baffle plate (29) is fixedly secured to the old baffle plate (28), and the new core shroud (11) is fixedly secured to the old shroud support leg (12).

4 Claims, 19 Drawing Sheets

F I G. 16
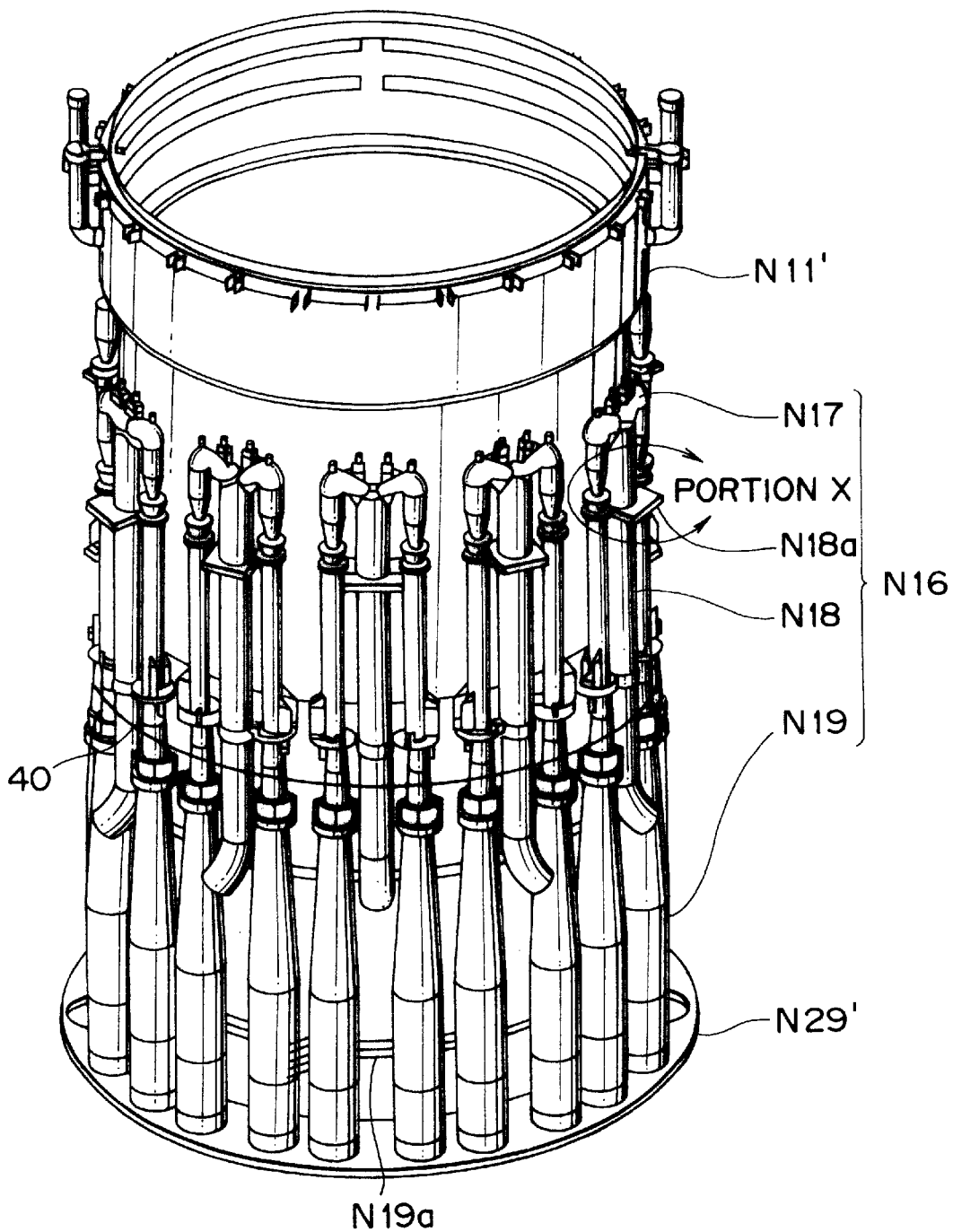

F I G. 20
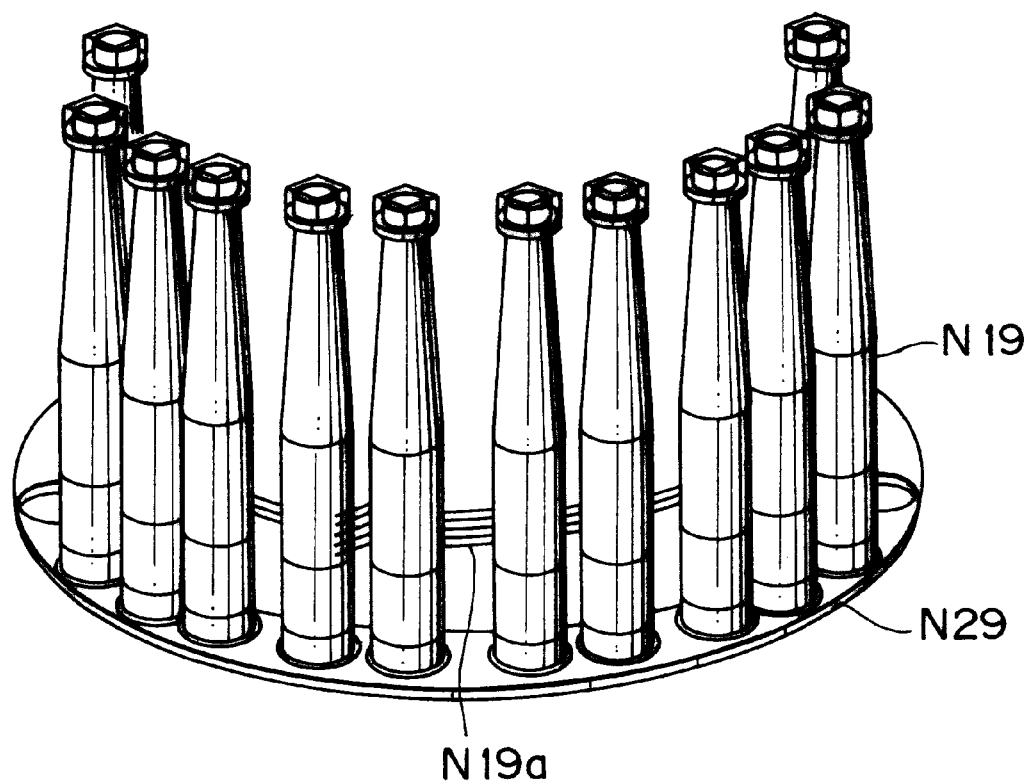

MOUNTING METHOD FOR CORE INTERNALS

TECHNICAL FIELD

The present invention relates to a mounting method for core internals for mounting core internals such as a core shroud in a reactor pressure vessel received in a reactor building of a nuclear power plant, and more particularly to a mounting method for core internals suitable for use when core internals are replaced.

BACKGROUND ART

In the past, when the core shroud as core internals or the like is replaced, an old core shroud and old core internals such as a jet pump are cut and disassembled, and carried out, after which a new core shroud and new core internals such as a jet pump are individually carried into a reactor pressure vessel (hereinafter called "RPV" (Reactor Pressure Vessel), and they are mounted by welding or the like, as described in, for example, Japanese Patent Laid Open No. Hei 8 233972, Japanese Patent Laid Open No. Hei 8 152495, or Japanese Patent Laid Open No. Hei 10 132985. The shroud is carried-in in the form divided into two parts or singly, and the jet pump is singly carried-in in the form of a jet pump inlet mixer, a jet jump riser, and a jet pump diffuser.

Further, there has been known an integral construction of core internals such as a core shroud and a jet pump, as described in, for example, Japanese Patent Laid Open No. Hei 6 281776.

DISCLOSURE OF INVENTION

The core shroud is for output of 800 Mwe, and has a weight of about 40 tons, a diameter of about 5 m, and a length of about 7 m. In order to carry the core shroud into a reactor building operating floor through a large article carrying in hatch, there are a case of interfering with a dimension of the large article carrying in hatch and a case where the capacity of a ceiling crane in the reactor building is short. Therefore, it is necessary to divide and carry in them, as described in Japanese Patent Laid Open No. Hei 8 233972, Japanese Patent Laid Open No. Hei 8 152495, or Japanese Patent Laid Open No. Hei 10 132985, posing a problem that a term of work for replacing the core shroud becomes long.

Further, since with respect to the jet pump, its constituent parts, 20 jet pump inlet mixers, 10 jet pump risers, and 20 jet pump diffusers have been singly carried in, a worker moves into the core to assemble them, which requires measures such as installation of a core internals shield, thus posing a problem that a term of work for replacement becomes long.

That is, in the conventional systems described in Japanese Patent Laid Open No. Hei 8 233972, Japanese Patent Laid Open No. Hei 8 152495, or Japanese Patent Laid Open No. Hei 10 132985, there encountered a problem that a term of work for replacement of core internals is extended over a long period of time to lower the availability factor of a nuclear power plant.

On the other hand, in the method described in Japanese Patent Laid Open No. Hei 6 281776, the core internals such as a core shroud and a jet pump are formed into an integral construction, and the core internals are installed. However, the core internals described in Japanese Patent Laid Open No. Hei 6 281776 comprises a construction in which for example, as shown in FIG. 14 of the aforesaid Publication, a piston ring 55 is provided between an outer peripheral end of a baffle plate 18 mounted on the end of a core shroud 2 and a reactor pressure vessel 1, which requires to change the construction itself of the reactor pressure vessel. Accordingly, there encountered a problem not capable of applying to replacement of core internals of a reactor pressure vessel of the existing nuclear power plant which has been already installed and operated.

It is an object of the present invention to provide a mounting method for core internals capable of shortening a term of work for replacing core internals of a reactor pressure vessel of the existing nuclear power plant to enhance the availability factor of the nuclear power plant.

(1) For achieving the aforementioned object, according to the present invention, an integrated module of core internals having a new core shroud, a new jet pump and a new baffle plate is carried into a reactor pressure vessel in which an old baffle plate and an old shroud support welded and fixedly secured to the reactor pressure vessel, the new baffle plate being fixedly secured to the old baffle plate, the new core shroud being fixedly secured to the old shroud support.

With the method as described above, there is provided an integrated module having a new shroud, a new jet pump and a new baffle plate for replacement, and the module is carried into the reactor pressure vessel, and the new baffle plate is fixed secured onto the old baffle plate. Thus, carrying in is easy and processing for removing a distortion is unnecessary, thus enabling shortening of a term of work for replacement.

(2) In the above described configuration (1), preferably, the integrated module of the core internals having the new shroud, the new jet pump and the new baffle plate is carried into the reactor pressure vessel through an opening provided on a roof of a reactor building for receiving the reactor pressure vessel.

With the method as described, since the module is carried in from the opening on the roof of the reactor building, the carrying in of divided shrouds and the individual carrying in of constituent parts of a jet pump are unnecessary, thus being capable of shortening a term of work for replacing core internals.

(3) In the above described configuration (1), preferably, the new jet pump comprises a new jet pump inlet mixer, a new jet pump riser, and a new jet pump diffuser, the new jet pump diffuser having a lower end fixedly secured to the new baffle plate, the new jet pump riser being secured to the new shroud by a new jet pump riser brace mounted on an outer wall of the new shroud.

(4) For achieving the aforementioned object, according to the present invention, an old core shroud and an old jet pump from an old shroud support and an old baffle plate from a reactor pressure vessel are cut and carried out, and an integrated module of core internals having a new core shroud, a new jet pump and a new baffle plate is carried into a reactor pressure vessel in which an old baffle plate and an old shroud support welded and fixedly secured to the reactor pressure vessel are left, the new baffle plate being fixedly secured to the old baffle plate, the new core shroud being fixed secured to the old shroud support.

With the method as described above, it is possible to shorten a term of work for replacement.

BRIEF DESCRIPTION OF DRAWINGS

FIG. 16 is a perspective view showing a constitution of an integral type module of a shroud and a jet pump used for the mounting method for core internals according to the second embodiment of the present invention.

FIG. 20 is a perspective view showing a constitution of an integral type module of a new baffle plate and a new diffuser used for the mounting method for core internals according to the fourth embodiment of the present invention.

BEST MODE FOR CARRYING OUT THE INVENTION

Figure 1:
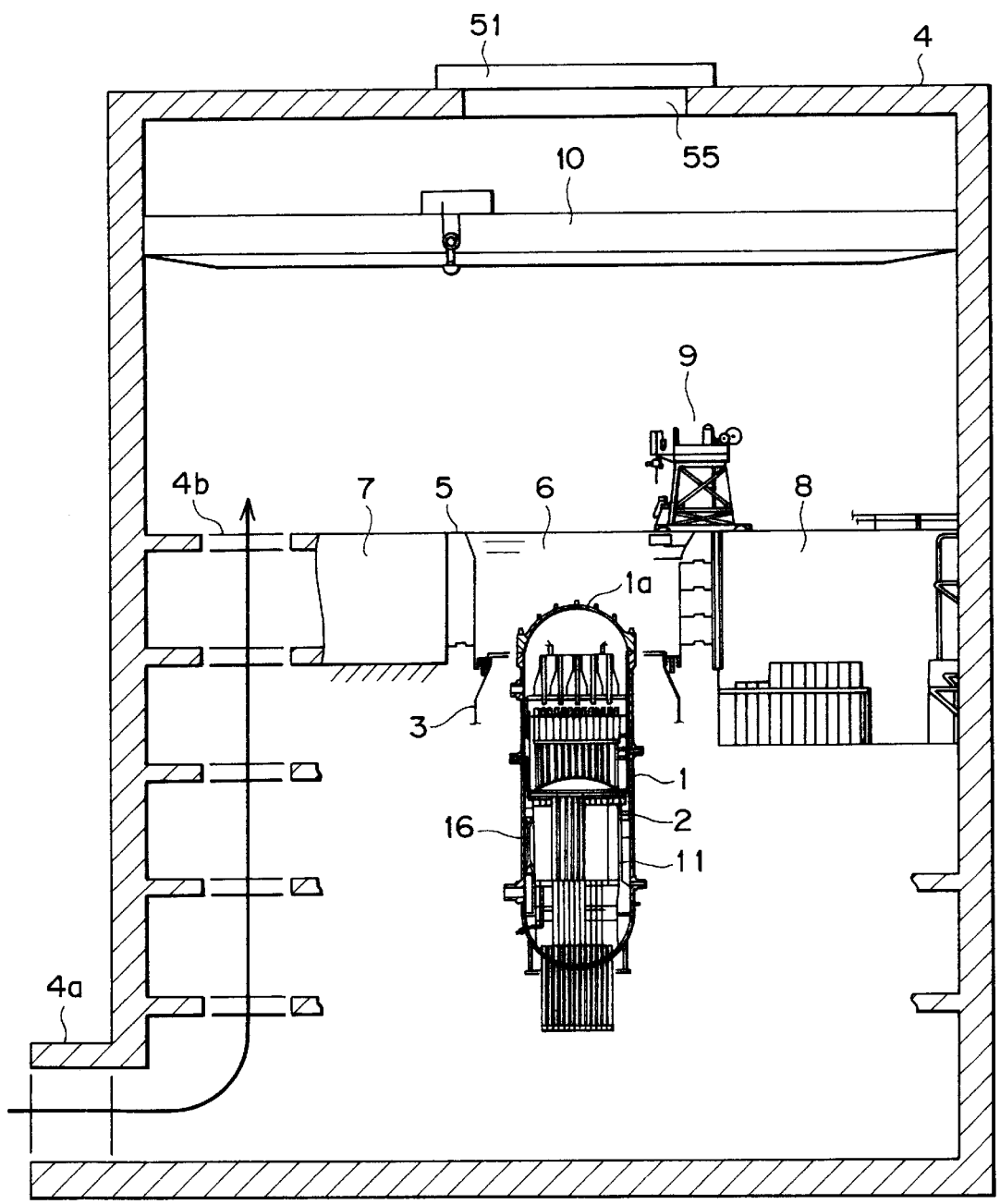
FIG. 1 is a sectional view showing a constitution of a reactor building near a reactor pressure vessel to which is applied a mounting method for core internals according to a first embodiment of the present invention.

A mounting method for core internals according to a first embodiment of the present invention will be described hereinafter with reference to FIGS. 1 to 14.

First, the constitution of a reactor building near a reactor pressure vessel to which is applied the mounting method for core internals according to the present embodiment will be described with reference to FIG. 1.

A reactor building 4 for a boiling water type reactor plant is interiorly arranged with a pressure container vessel (hereinafter called "PCV" (Pressure Container Vessel)) 3 under the operating floor 5. PCV 3 interiorly receives a reactor pressure vessel (hereinafter called "RPV") 1. The PRV1 is provided with core internals 2. The core internals 2 are a construction within RPV1, and is composed of a core shroud (hereinafter called "shroud") 11, and a jet pump 16. The shroud 11 is tubular core internals surrounding a core arranged within RPV1. A jet pump 16 is arranged on the outer peripheral side of the shroud 11.

Above RPV1 are provided a reactor well 6, a fuel pool 8 for storing fuel, and an apparatus pool 7 for temporarily placing therein core internals such as a steam dryer removed during a periodic inspection. Further, a fuel replacing truck 9 for replacing fuel is provided on the operating floor 5. Further, a ceiling crane 10 is provided near a roof of the reactor building 4. The ceiling crane 10 is mainly to raise members to be removed during the periodic inspection such as a reactor pressure vessel top head (hereinafter called "RPV top head") 1a, a steam dryer, and a steam separator shroud head of the core internals 2.

An apparatus carrying in inlet 4a is provided under the reactor building 4, and apparatus hatches 4b are arranged in each floor to the operating floor 5. An opening 55 is provided above the reactor building 4 and above RPV1. The opening 55 has the size enough to carry out old core internals 2 to be replaced or to carry in core internals to be mounted newly. A closable door 51 is installed on the opening 55.

Figure 2:
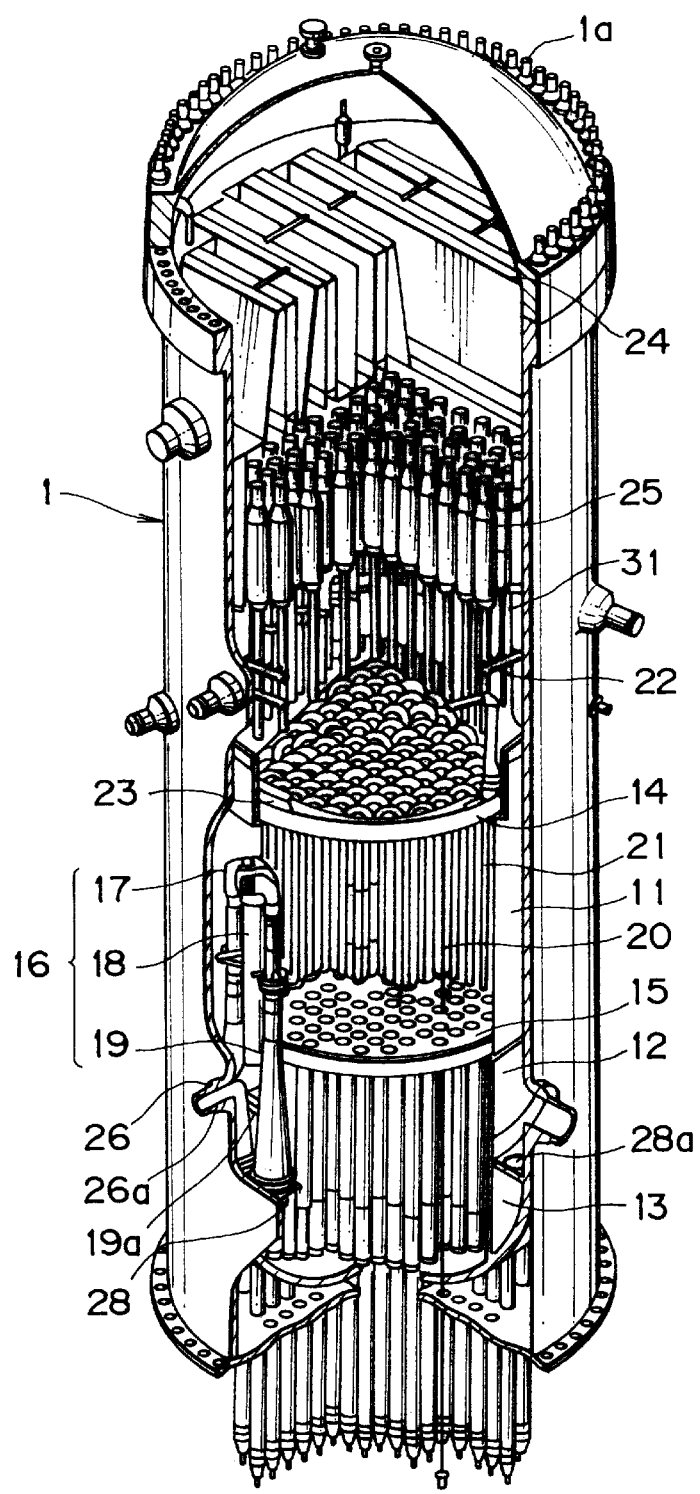
FIG. 2 is a partially sectioned perspective view showing an internal constitution of RPV as an object for the mounting method for core internals according to the first embodiment of the present invention.

Next, the internal constitution of RPV to be an object of the mounting method for an in-pile construction according to the present embodiment will be described with reference to FIG. 2.

The shroud 11 is arranged in a central portion within RPV1 and supported by a shroud support cylinder 12. The shroud support cylinder 12 is supported on the bottom of RPV1 by a baffle plate 28 and a shroud support leg 13.

The shroud 11 is interiorly provided, at an upper part, with an upper lattice plate 14 as an upper core support plate, and at a lower part, with a core support plate 15 as a lower core support plate. Further, a control rod 20 and a fuel assembly 21 are installed internally of the shroud 11.

A jet pump 16 is provided between the shroud 11 and RPV1. The jet pump 16 comprises a jet pump inlet mixer (hereinafter called "inlet mixer") 17, a jet pump riser (hereinafter called "riser") 18, a jet pump diffuser (hereinafter called "diffuser") 19, and an instrumentation line (hereinafter called "sensing line") 19*a*. The riser 18 has one end connected to a thermal sleeve 26*a* of a recirculation inlet nozzle 26, and the other end connected to the inlet mixer 17. The diffuser 19 has one end mounted on the baffle plate 28 and the other end connected to the inlet mixer 17. The baffle plate 26 is formed, at a mounting portion relative to the diffuser 19, with a hole 28*a* through which reactor water passes. One (or two) sensing line(s) 19*a* is extended out of each diffuser 19 for the purpose of measuring pressure, and is connected to an out pile line by an instrumentation nozzle through the inner side of a group of diffusers.

Above the shroud 11 are provided a steam dryer 24, steam separator shroud heads 25, a guide rod 31, a feedwater sparger 22, and a core spray sparger 23.

Figure 3:
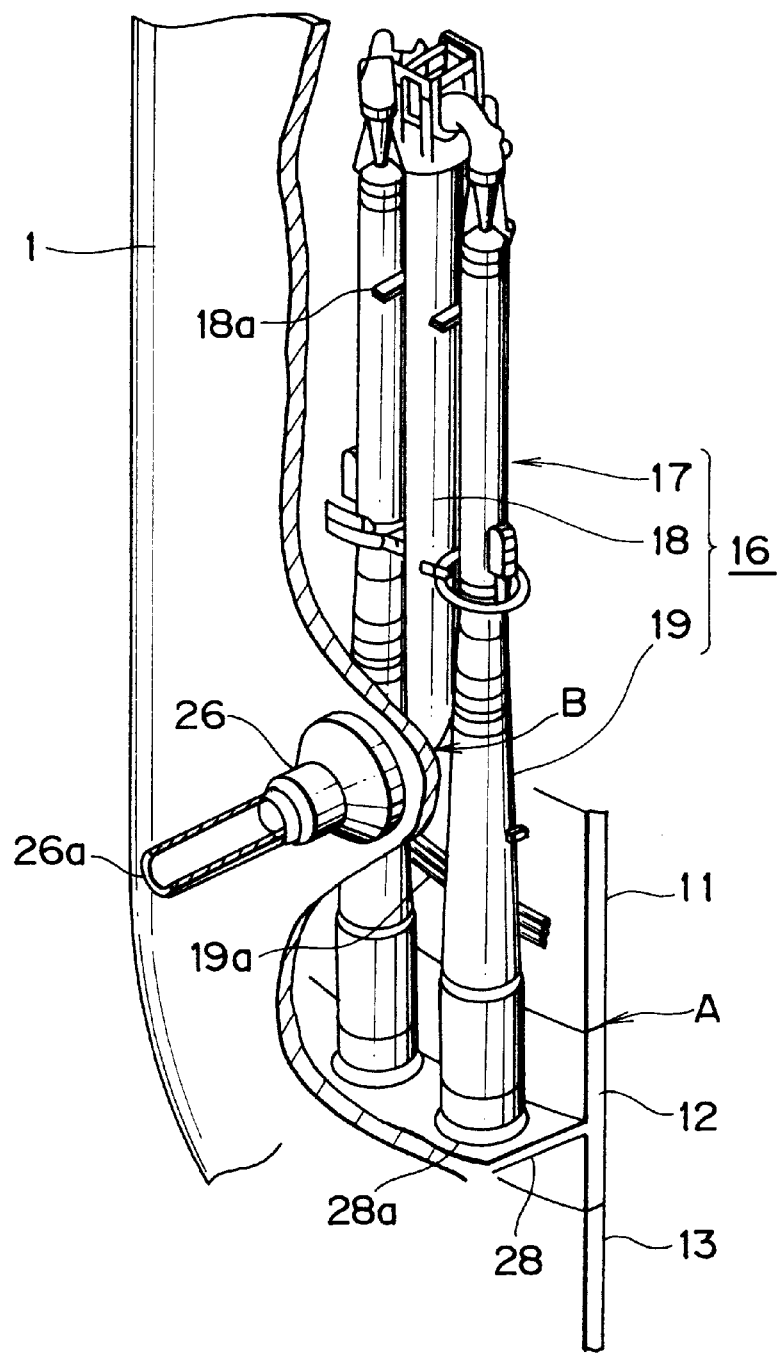
FIG. 3 is a partially sectioned perspective view showing a state that an old shroud and an old jet pump prior to carrying out in the mounting work for core internals according to the first embodiment of the present invention are installed within RPV.

Next, a description will be made, with reference to FIG. 3, of a state that an old shroud 11 and an old jet pump 16 prior to carrying out in the mounting work for core internals according to the present embodiment are installed in PRV1. It is noted that the same reference numerals as those of FIG. 2 denote the same parts.

The cylindrical shroud support cylinder 12 is secured on the shroud support leg 13 supported on the bottom of RPV1 by welding or the like. In the inner peripheral side of the ring like baffle plate 28, the shroud support cylinder 12 is secured to the outer peripheral surface thereof by welding or the like, and the outer peripheral side is secured to the inner peripheral surface of RPV1 by welding or the like. The shroud 11 is secured by welding or the like too the shroud support cylinder 12.

The jet pump 16 is provided between the shroud 11 and RPV1. The jet pump 16 comprises the inlet mixer 17, the riser 18, and the diffuse 19. The jet pump 16 is secured to the inner wall of RPV1 by a jet pump riser brace (hereinafter called "riser brace") 18*a*. The riser 18 has one end connected to a thermal sleeve 26*a* of a recirculation inlet nozzle 26 and the other end connected to the inlet mixer 17. The diffuser 19 has one end mounted on the baffle plate 28 and the other end connected to the inlet mixer 17. The baffle plate 28 is formed, at a mounting portion relative to the diffuser 19, with a hole 28*a* through which reactor water passes.

Next, working steps of the mounting method for core internals according to the present embodiment will be described with reference to FIGS. 4 and 5 to 14.

Figure 4:
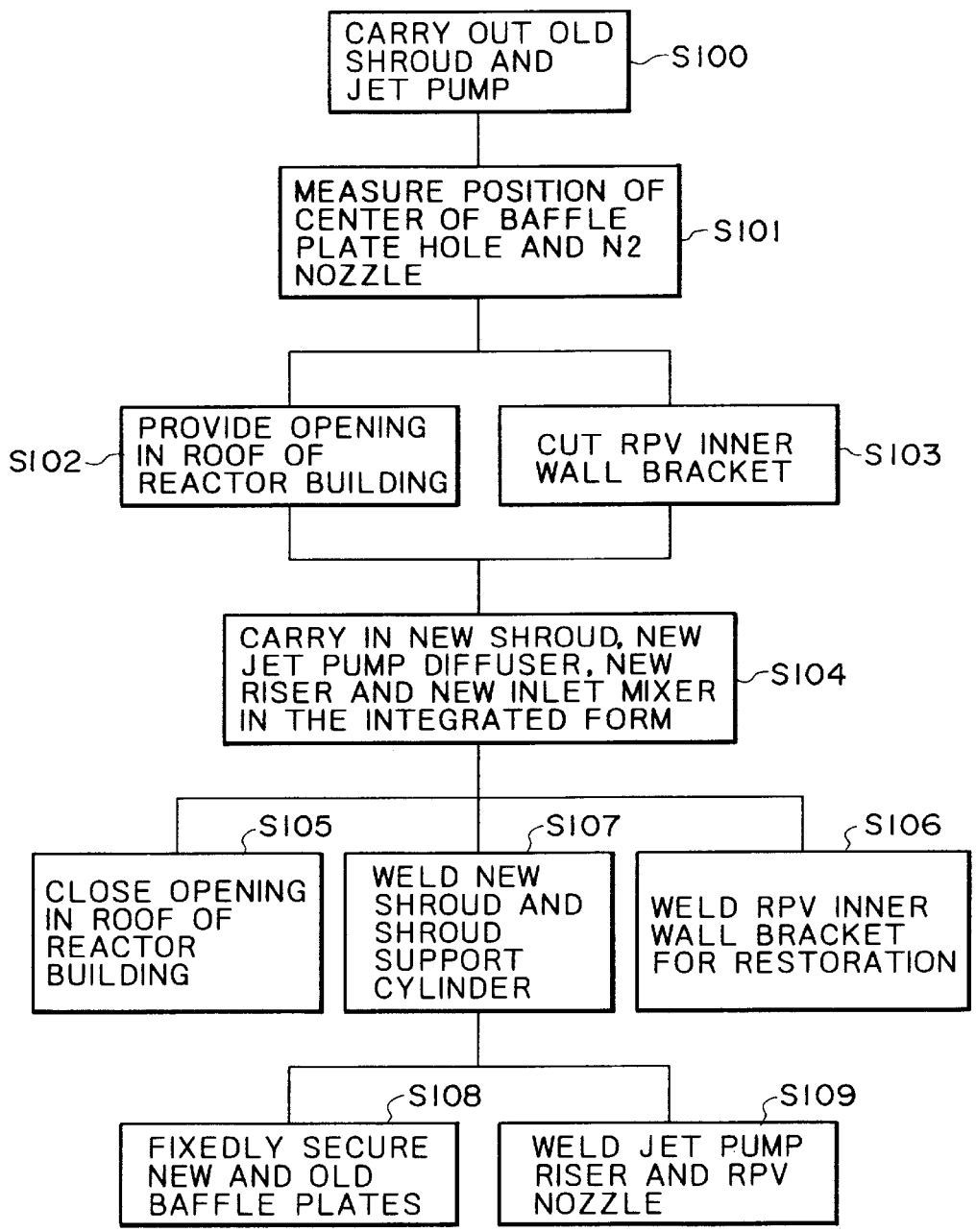
FIG. 4 is a flow chart of steps showing working steps of the mounting method for core internals according to the first embodiment of the present invention.

First, in Step S100 in FIG. 4, old core internals to be replaced such as the old shroud 11 and the old jet pump 16 within RPV1 are carried out. To be more specific, the shroud 11 is carried out in such a manner that it is cut in a connecting portion A relative to the shroud support cylinder 12 shown in FIG. 3. The old jet pump 16 is carried out in such a manner that the riser brace 18*a* is removed, a connecting portion B between the riser 18 and the nozzle thermal sleeve 26*a* of the recirculation inlet 26 is cut, and the diffuser 19 is separated from the baffle plate 28.

The old core internals to be replaced such as the old shroud 11 and the old jet pump 16 are disassembled, and then carried out from the apparatus hatches 4*b* and the apparatus carrying in inlet 4*a* by the ceiling crane 10 as shown in FIG. 1. It is also possible to carry out them from the opening 55 while remaining large in size without being disassembled, as will be described later.

Next, a description will be made, with reference to FIG. 5, of a state of RPV1 in a state that the step of Step S100 in FIG. 4 has, been terminated.

When the step of Step S100 in FIG. 4 is terminated, the core internals such as the old shroud 11 and the old jet pump 16 are carried out, and within the RPV1 remain the shroud support cylinder 12, the baffle plate 28, the shroud support leg 13, and brackets such as a guide support bracket 31*a*, a feedwater sparger support bracket 22*a*, and a core spray sparger support bracket 23*a*.

In the drawing, a portion A is a cut portion between the shroud 11 and the shroud support cylinder 12, and in the drawing, a portion B is a cut portion between the riser 18 and the nozzle thermal sleeve 26*a* of the reciculatiion inlet 26.

That is, in the present embodiment, when the old core internals (the old shroud 11 and the old jet pump 16) are carried out, the baffle plate 28, the shroud support cylinder 12 and the shroud support leg 13 are to be left. Since the baffle plate 28 and the shroud support cylinder 12 are directly connected to the wall surface of RPV1, when the baffle plate 28 and the shroud support cylinder 12 are separated from the RPV1 and then carried out, there is a possibility that are necessary post processing for removing a distortion generated by cutting, and heat treatment for removing stress and distortion generated by welding after a new baffle plate and a new shroud support cylinder have been newly welded and secured to RPV1. When these processings are carried out, the working time is extended over a long period of time and work is to be done under high radiation dose, because of which the exposure rate of workers increases, whereas the baffle plate 28 and the shroud support cylinder 12 are to be left as described above whereby the work time for replacement can be shortened, and the exposure rate of workers can be reduced.

Next, in Step S101 in FIG. 4, in order that a new jet pump is easily set within the reactor, positions of the recirculation inlet nozzle 26 and the baffle plate hole 28*a* in which a new riser is joined with a new diffuser are measured to be reflected on the dimension when the new jet pump and the new shroud are assembled.

Figure 6:
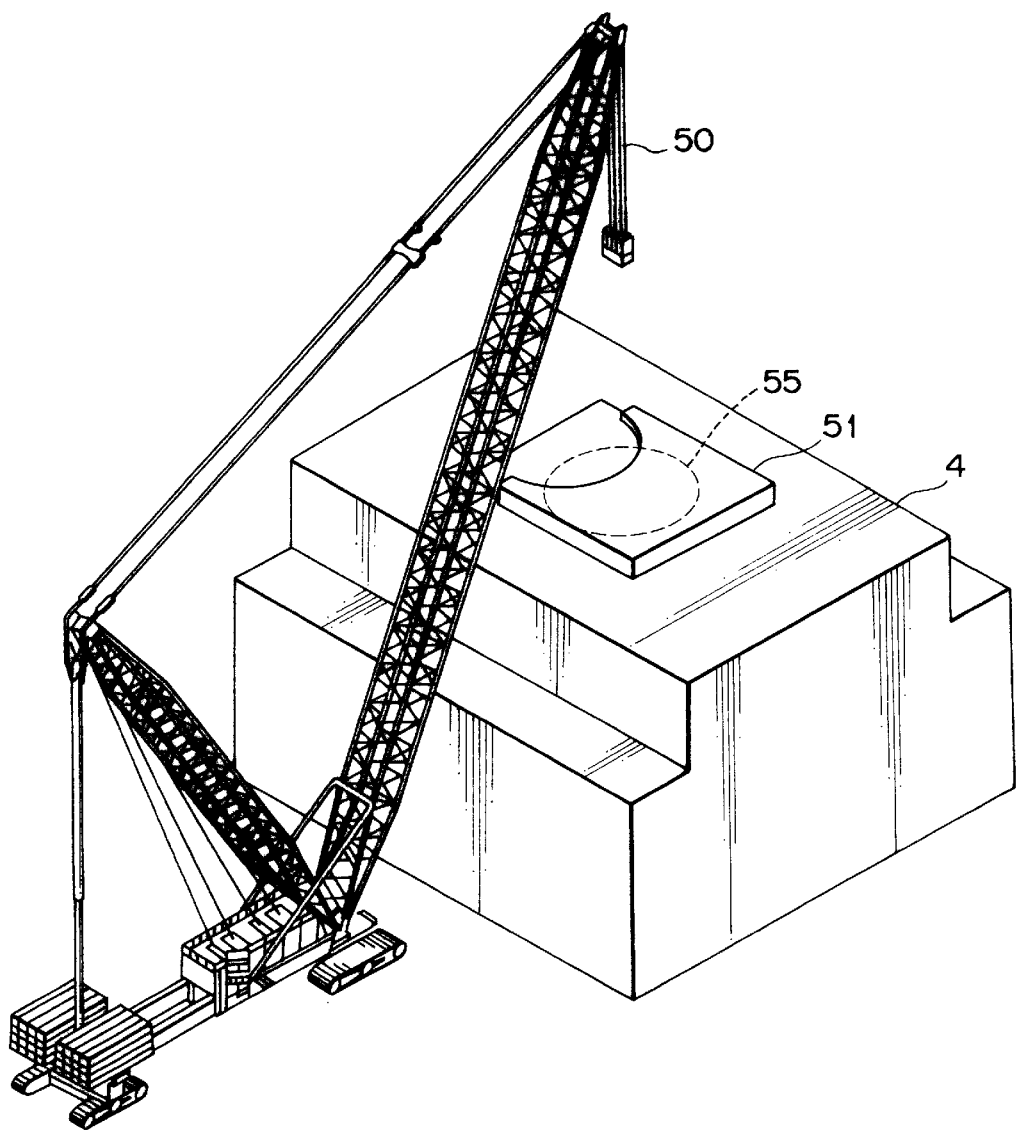
FIG. 6 is an explanatory view showing a state of neighborhood of a roof and an outdoor of a reactor building in the mounting method for core internals according to the first embodiment of the present invention.

Next, in Step S102, as shown in FIG. 6, the closable door 51 provided on the ceiling of the reactor building 4 is moved to open the opening 55, and a crane 50 is installed in the vicinity of outdoor of the reactor building 4.

Next, in Step 103 in FIG. 4, brackets left within RPV are cut and removed side by side with Step S102. That is, brackets such as the guide rod support bracket 31*a*, the feedwater sparger support bracket 22*a*, and the core spray sparger support bracket 23*a* left within RPV1 shown in FIG. 5 are cut and removed where they interfere when an integrated module of a new shroud and a new jet pump described later are carried in.

Next, in Step 104 in FIG. 4, the integrated module having a new shroud and a new jet pump is carried in the reactor building 4 and carried in RPV1 through the opening 55 of the reactor building 4 using a crane shown in FIG. 6.

Figure 7:
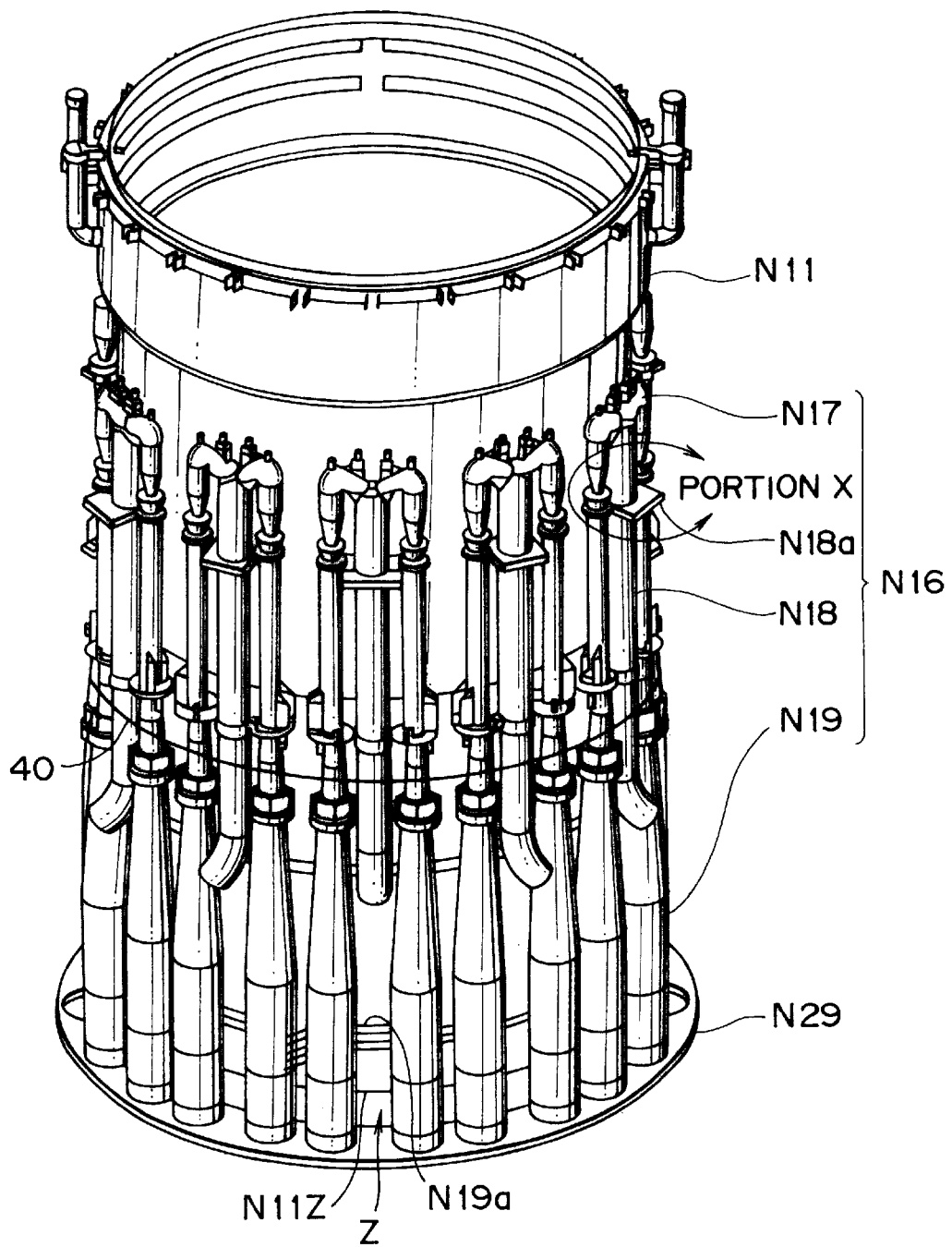
FIG. 7 is a perspective view showing a constitution of an integral type module of a shroud and a jet pump used for the mounting method for core internals according to the first embodiment of the present invention.
Figure 8:
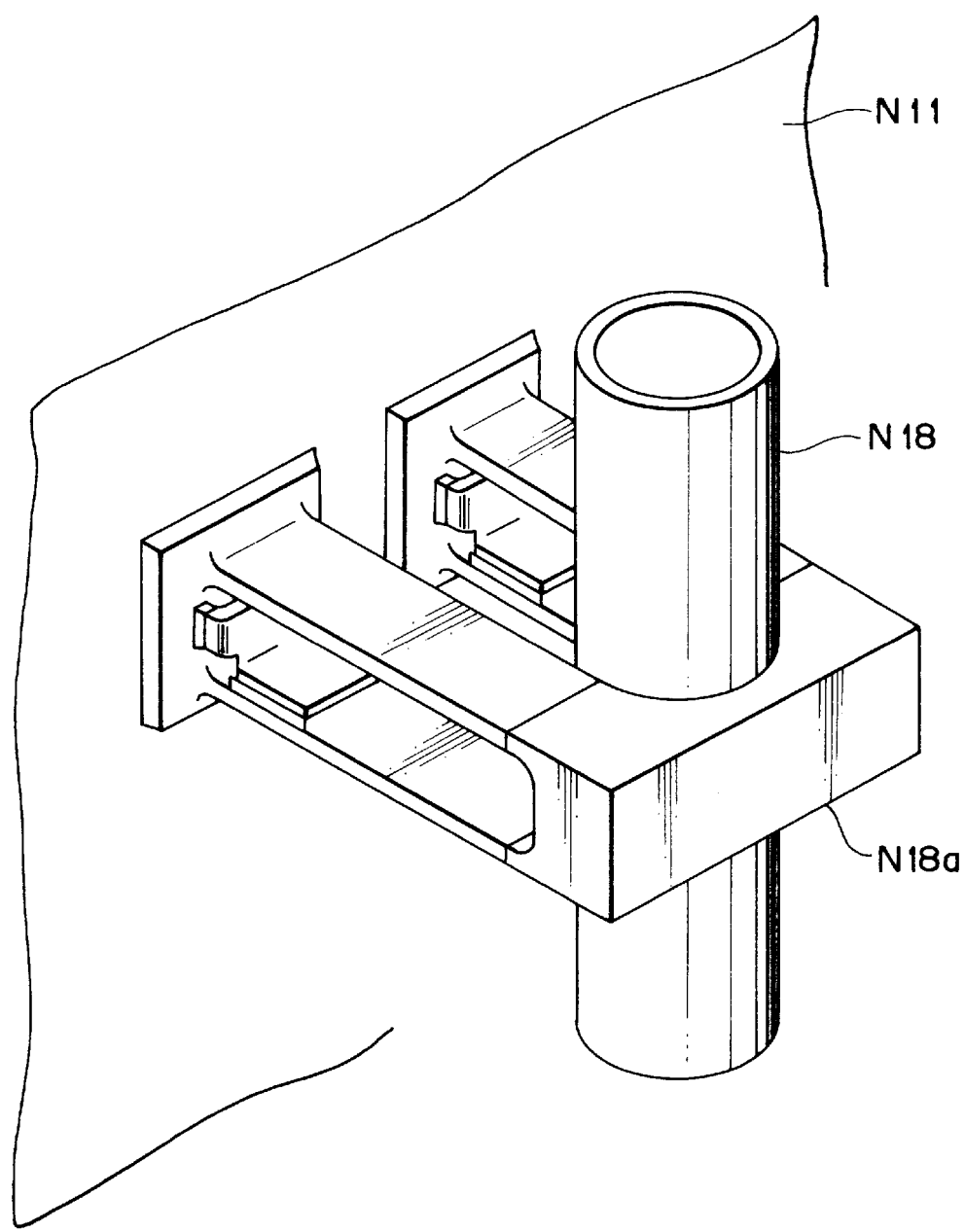
FIG. 8 is an enlarged perspective view of a portion X in FIG. 7.

The constitution of the integrated type module of a shroud and a jet pump used in the mounting method for core internals according to the present embodiment will be described with reference to FIGS. 7 and 8. FIG. 8 shows a state that the portion X in FIG. 7 is enlarged.

A new riser brace N18*a* is mounted on the outer wall of a new shroud N11, as shown in FIG. 8, to fix a new riser N18. The lower end of a new diffuser N19 is fixed secured to airing like new baffle plate N29. The new baffle plate N29 is formed, at a mounting portion relative to the diffuser N19, with a hole through which reactor water passes. The upper end of the new diffuser N19 and the upper end of the new riser N18 are respectively secured to a new inlet mixer N17.

A space Z is formed between the lower end N11Z of the new shroud 11 and the inner peripheral side of the new baffle plate N29. When the sensing line 19a is incorporated into the module, it is fixed to a diffuser, but details of the range and mounting method thereof are determined by the execution method of the sensing line 19a.

With the constitution described above, the new jet pump N16 comprising the new inlet mixer N17, the new riser N18 and the new diffuser N19 constitutes the integrated module with the new shroud N11 together with the new baffle plate N29.

Further, a belt 40 is mounted externally of the new riser N18. Where the integrated module having the new core shroud N11 and the new jet pump N16 interferes with the brackets such as the guide rod support bracket 31a mounted on the inner wall of RPV1 when the module is carried in RPV1, the belt 40 is tightened and the new riser N18 is moved toward the new shroud N11 to avoid an interference with the brackets, whereby the module can be carried into RPV. After carrying in, the belt 40 is removed.

Where the interference between the brackets and the integrated type module newly carried in can be avoided by using the belt 40, the aforementioned Step S103, and Step S106 described later can be omitted.

Next, the state of carrying in of the integrated type module in the mounting method for core internals according to the present embodiment will be described with reference to FIGS. 9 and 10.

Figure 9:
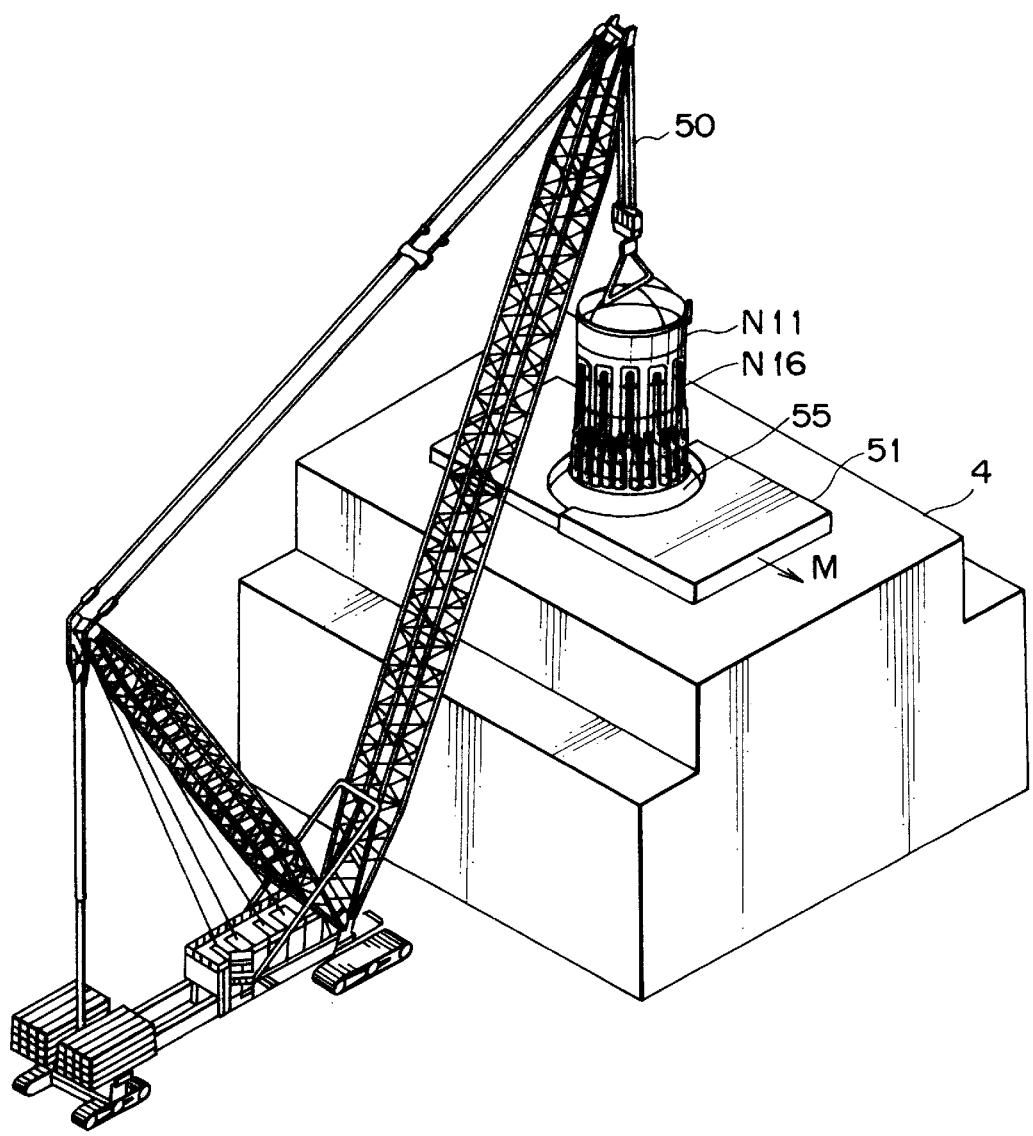
FIG. 9 is an explanatory view of a carrying in state of an integral type module in the mounting method for core internals according to the first embodiment of the present invention.

As shown in FIG. 9, the door 51 provided on the reactor building 4 is moved in a direction indicated by arrow M to open the opening 55. The integrated module comprising the new shroud N11 and the new jet pump N16 is raised by the crane 50, and is carried into the reactor building 4 from the opening 55 of the reactor building 4.

Figure 10:
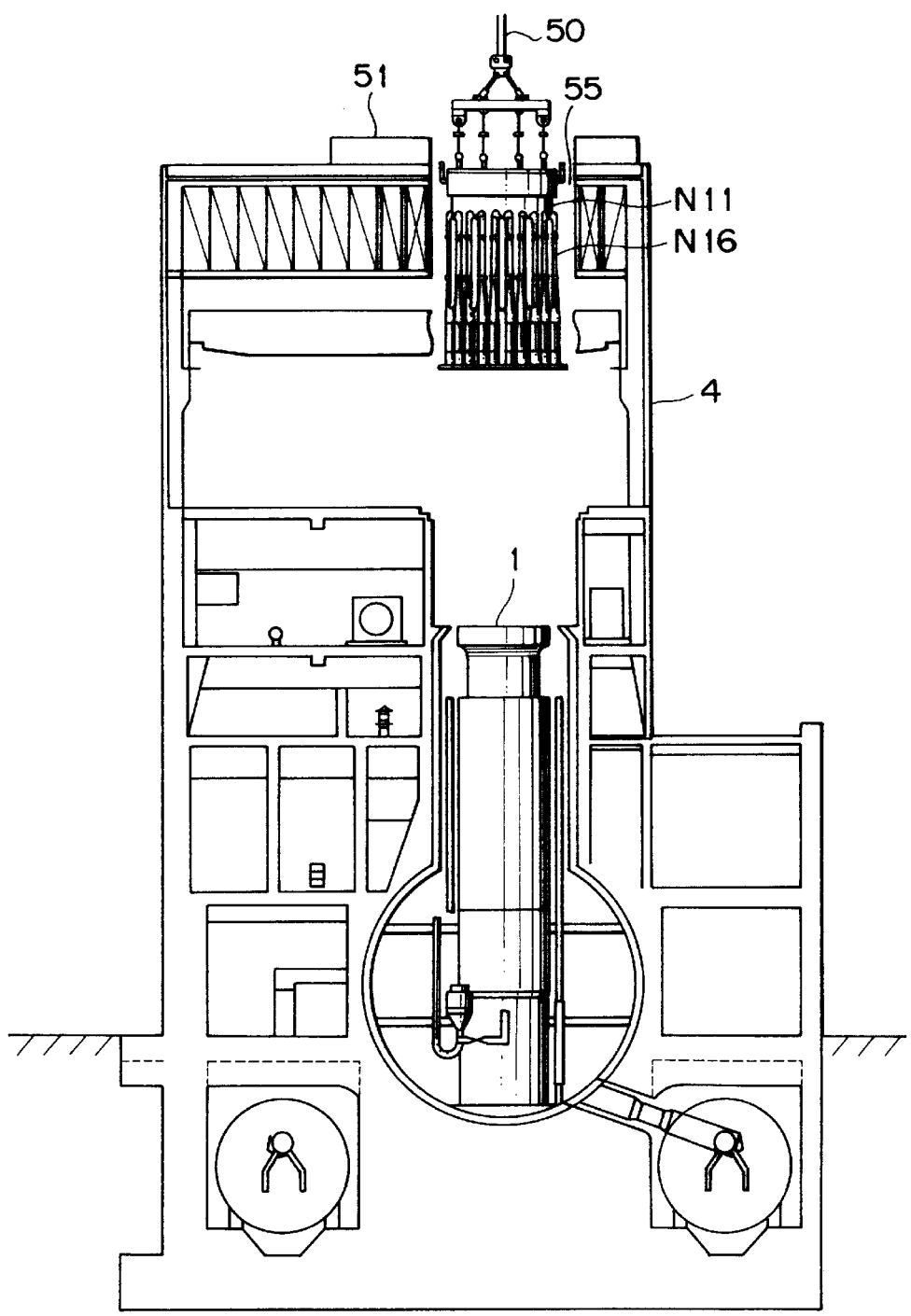
FIG. 10 is an explanatory view of a carrying in state of an integral type module in the mounting method for core internals according to the first embodiment of the present invention.

As shown in FIG. 10, the opening 55 has an aperture enough to carry in the integrated module comprising the new shroud N11 and the new jet pump N16 without interference, and the module is carried into the reactor building 4 from the opening 55 of the reactor building 4 and set within RPV1, using the crane 50.

Where in carrying out of the old shroud and the old jet pump in Step S100, the old shroud and the old jet pump are carried out without being disassembled, the steps of installing the roof opening and installing the crane in Step S100 can be carried out prior to Step S100, whereby the old shroud and the old jet pump can be also carried out from the opening of the reactor building using the crane.

Next, in Step S105, the door 51 provided on the ceiling of the reactor building 4 is moved to close the opening 55, and the crane 50 installed in the vicinity of roof of the reactor building 4 is disassembled and removed.

Next, in Step S106, the brackets such as the guide rod support bracket 31a within RPV cut and removed in Step S103 are welded and restored side by side with Step S105. Where an interference between an integrated type module newly carried in and the brackets can be avoided by using the belt 40 explained in FIG. 7, Step S106 can be omitted.

Next, in Step S107, the new shroud N11 and the shroud support cylinder 12 are connected by welding.

The connecting state of a new shroud and a shroud support in the mounting method for core internals according to the present embodiment will be described with reference to FIG. 11. The same reference numerals as those in FIGS. 5 and 7 indicate the same parts.

The module having the new shroud N11 and the new jet pump N16 integrated is installed on the shroud support cylinder 12, and the lower end of the new shroud N11 and the upper end of the shroud support cylinder 12 are connected by welding at a connecting portion C.

Figure 11:
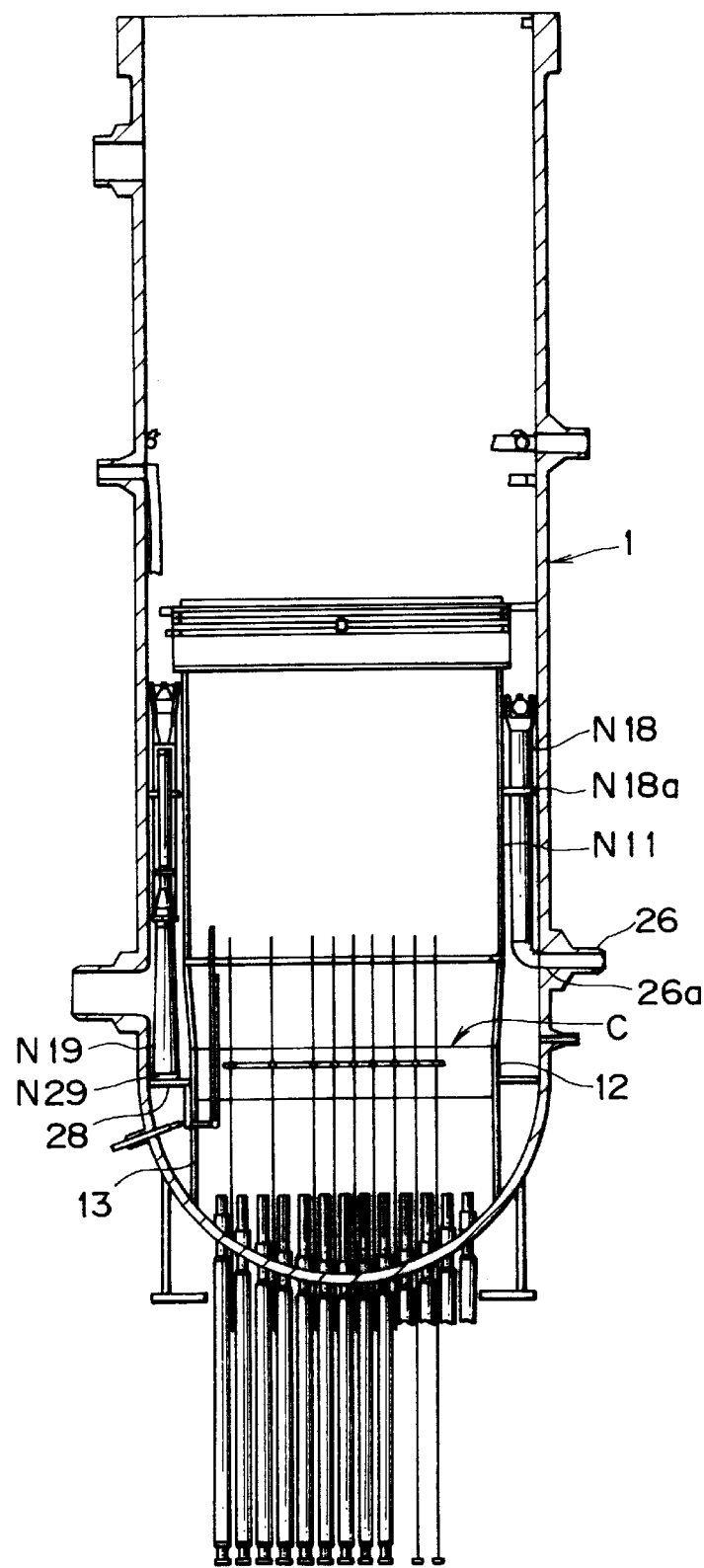
FIG. 11 is an explanatory view of a connecting state of a new shroud and a shroud support in the mounting method for core internals according to the first embodiment of the present invention.

Next, in Step S108, the new baffle plate N29 and the old baffle plate 28 shown in FIG. 11 are fixedly secured.

The securing state of the new baffle plate 29 and the old baffle plate 28 will be described with reference to FIGS. 12 an 13.

Figure 12:
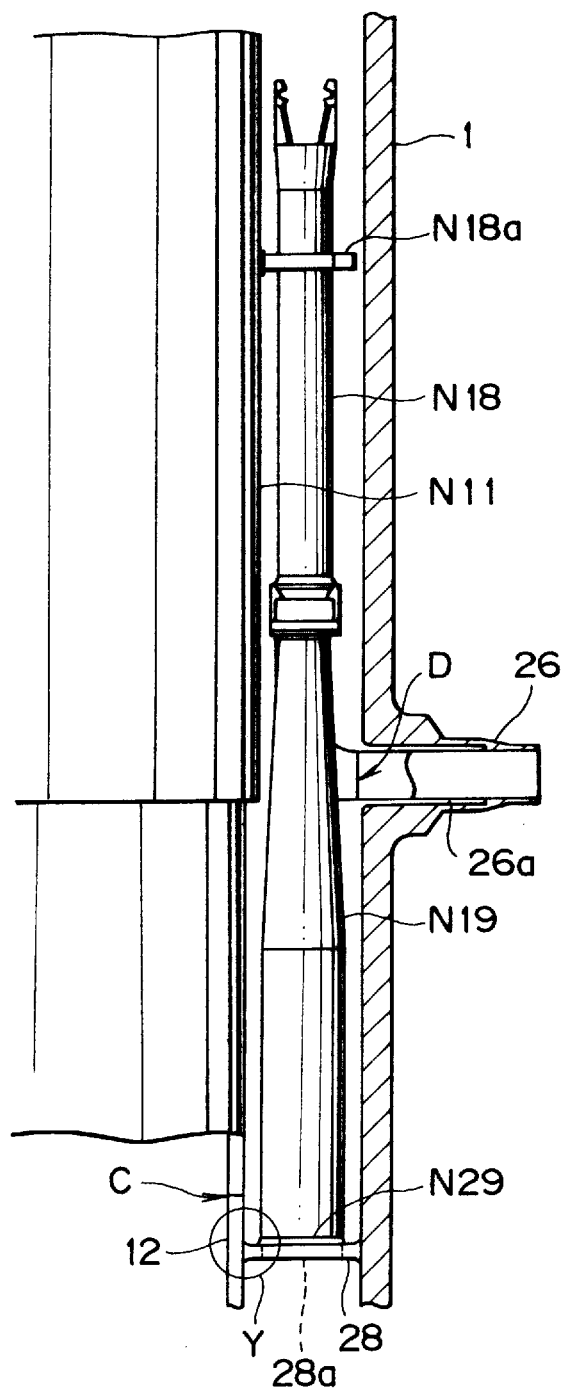
FIG. 12 shows a state that a new shroud, a new jet pump and a new baffle plate are set within the reactor in the mounting method for core internals according to the first embodiment of the present invention.
Figure 13:
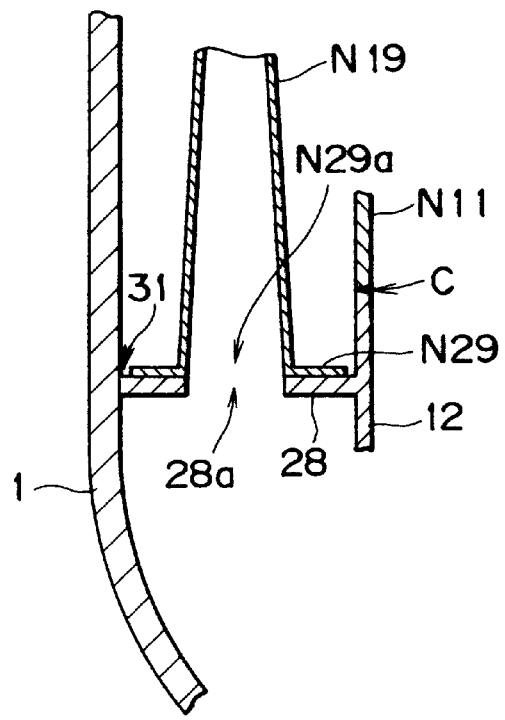
FIG. 13 is an enlarged perspective view of a portion Y in FIG. 12.

FIG. 12 is an explanatory view of a state that the new shroud N11, the new jet pump N16 and the new baffle plate N29 are set within the reactor in the mounting method for core internals according to the first embodiment of the present invention. FIG. 13 is an enlarged perspective view of a portion Y in FIG. 12.

As shown in FIG. 12, the new shroud N11 is connected to the shroud support cylinder 12 by welding at a connecting portion C. The new baffle plate N29 is installed on the old baffle plate 28.

As shown in FIG. 13, the new baffle plate N29 and the old baffle plate 28 are fixedly secured by welding at a welding portion 31.

Next, another securing method of the new baffle plate N29 and the old baffle plate 28 in the present embodiment will be described with reference to FIG. 14.

Figure 14:
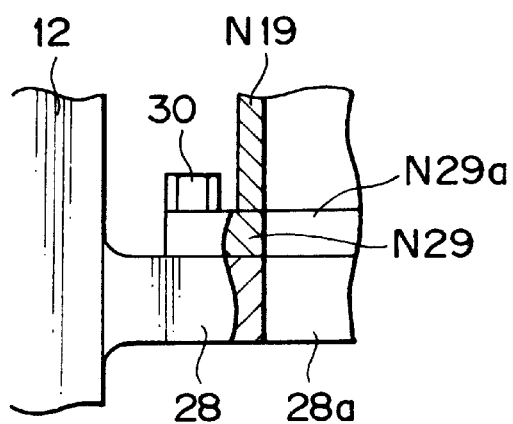
FIG. 14 is an explanatory view of another securing method for a new baffle plate and an old baffle plate in the mounting method for core internals according to the first embodiment of the present invention.

As shown in FIG. 14, the new baffle plate N29 and the old baffle plate 28 are fixedly secured by means of a bolt 30.

Next, in Step S109, as shown in FIG. 12, the new riser N18 and the thermal sleeve 26a of the recirculation inlet nozzle 26 are connected at a connecting portion D. Fine adjustment of positions of the new riser N18 and the recirculation inlet nozzle 26 can be attained by providing a tolerance in a longitudinal direction of the thermal sleeve 26a.

As described above, according to the present embodiment, since the new shroud, the new jet pump and the new baffle plate for replacement are integrated into a module, and the module is carried in from the opening of a roof of the reactor building, the divided carrying in of a shroud and the individual carrying in of components of a jet pump as in prior art are unnecessary, and a term of period for replacing core internals can be shortened. Accordingly, the availability factor of nuclear power plant can be enhanced.

Further, since the jet pump is also constituted integrally and then carried into the reactor to reduce the assembling work within the reactor, a simple in pile shield will suffice, the number of steps of installing and disassembling an in pile shield can be considerably reduced, and a period of work in the reactor can be shortened, thus enabling reduction in exposure dose of workers to less than a half.

Further, unlike the method described in Japanese Patent Laid Open No. Hei 6 281776, the construction itself of the reactor pressure vessel need not be changed but the present embodiment can be applied to replacement of core internals of a reactor pressure vessel of the existing nuclear power plant which is already installed and being operated.

Further, in cutting and removing the old shroud and the old jet pump, thy baffle plate and the shroud support leg constituting a pressure boundary are to be left by being welded and secured to the reactor pressure vessel, and the new baffle plate is fixedly secured to the old baffle plate. Therefore, processing for removing a distortion and heat treatment for removing stress and distortion are unnecessary to thereby enable shortening a term of work for replacement.

A term of work from carrying in to completion of installation can be shortened by about 30% as compared with the conventional method in which a shroud is divided into two parts and carried in, and a jet pump is carried in every component.

Figure 17:
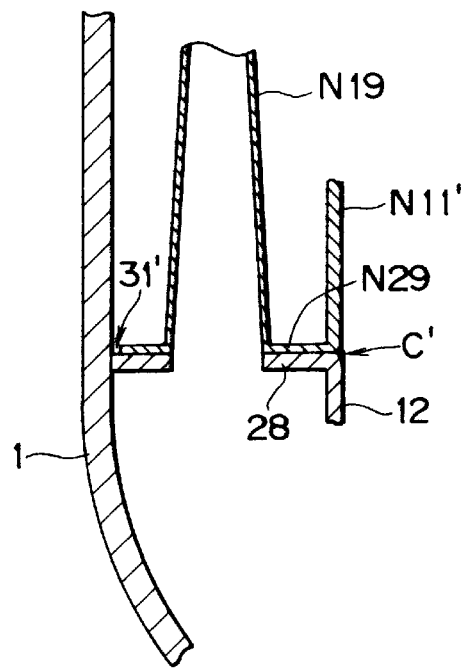
FIG. 17 is an explanatory view of a connecting state of a new shroud and a new baffle plate in the mounting method for core internals according to the second embodiment of the present invention.

Next, a method for mounting core internals according to a second embodiment of the present invention will be described with reference to FIGS. 15 to 17.

The work steps for the mounting method for core internals according to the second embodiment are similar to the flow chart shown in FIG. 4. The present embodiment is different in 1) the shape of a construction left on the RPV side when the old shroud and the old jet pump are cut and removed, and different from that shown in FIG. 7 in 2) a constitution of a module integrated by a new shroud, a new jet pump, and a new baffle plate carried into RPV in Step S104 of FIG. 4.

Figure 15:
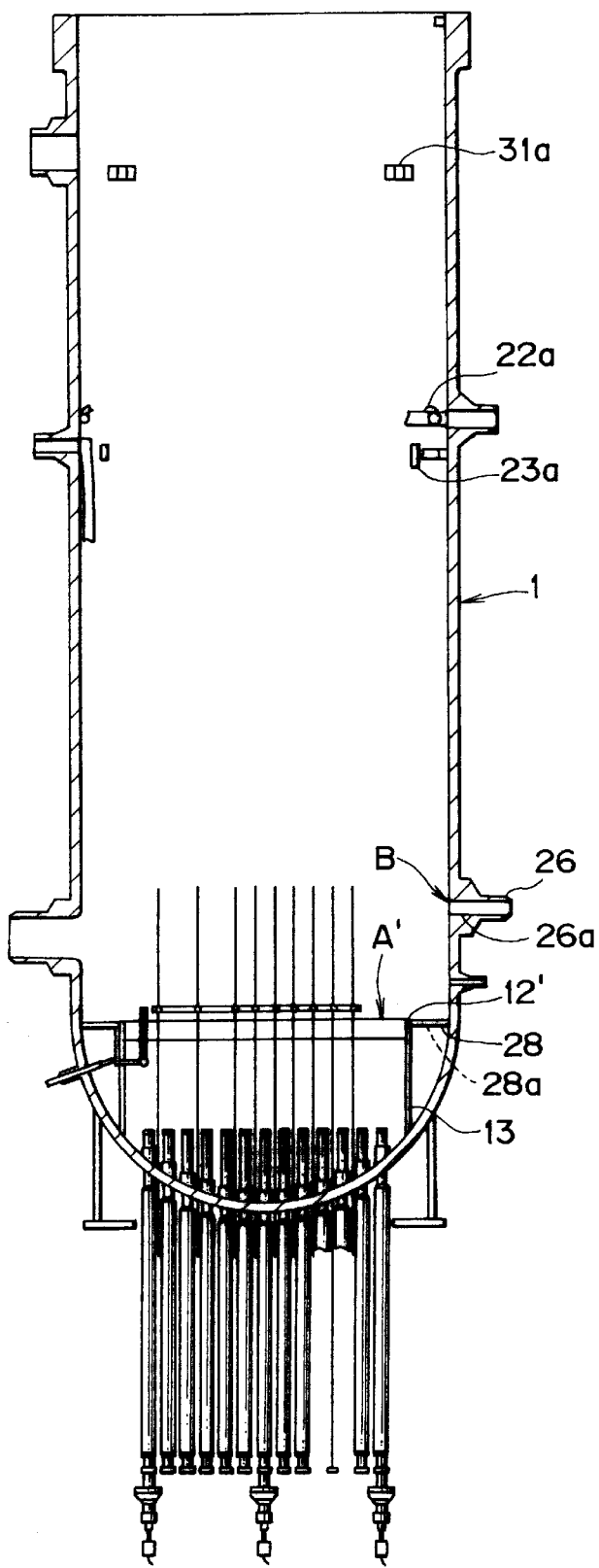
FIG. 15 is an explanatory view of a state of RPV in a state that the step of Step S100 of FIG. 4 was terminated according to a second embodiment of the present invention.

First, a description is made of a state of RPV1 in a state that the step of Step S100 of FIG. 4 has been terminated, with reference to FIG. 15. The same reference numerals in FIG. 5 indicate the same parts.

When Step S100 in FIG. 4 is terminated, the core internals such as the old shroud 11 and the old jet pump 16 are removed, and within RPV1 are left a shroud support cylinder 12', a baffle plate 28, and a shroud support leg 13, and brackets such as a guide rod support bracket 31a, a feedwater sparger support plate 22a, and a core spray sparger support bracket 23a. These constructions are not to be replaced.

Figure 5:
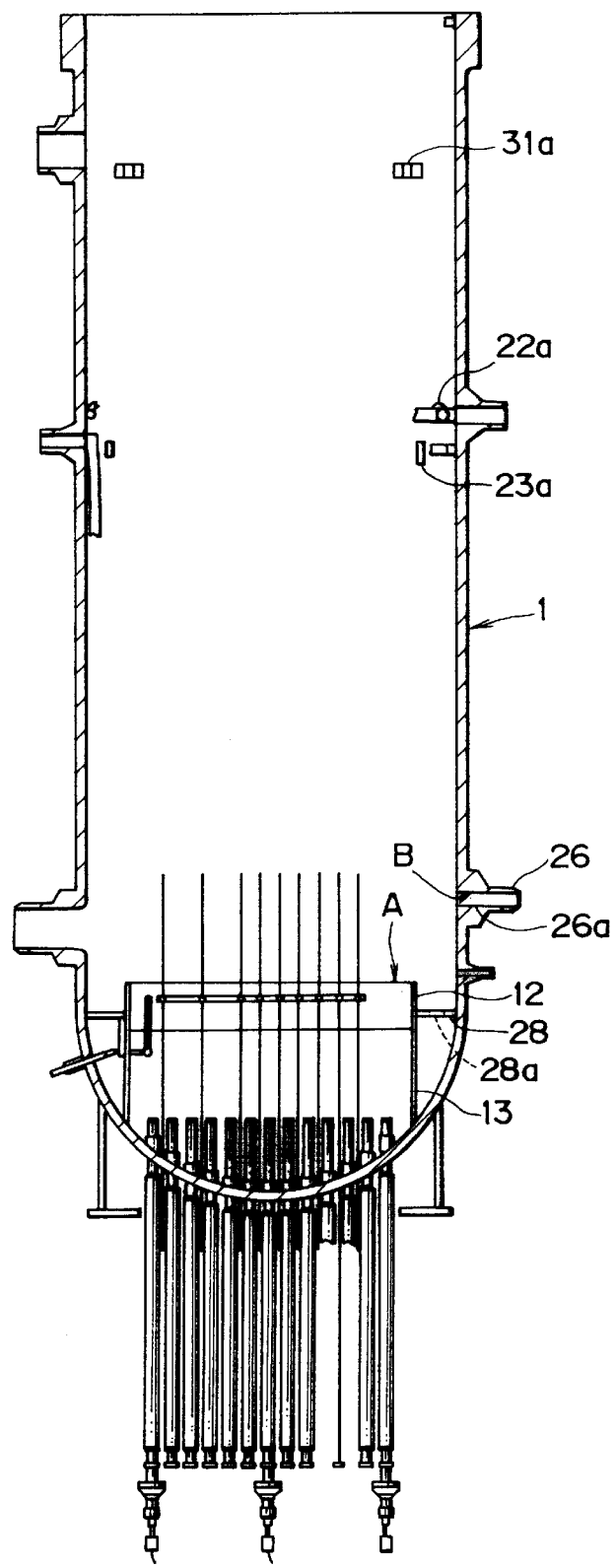
FIG. 5 is an explanatory view of a state of RPV in a state that the step of Step S100 of FIG. 4 was terminated according to the first embodiment of the present invention.

In the example shown in FIG. 5, in the connecting portion of the shroud 11 and the shroud support cylinder 12, cutting is made, whereas in the present embodiment, the shroud support cylinder 12' is cut at a position halfway of the shroud support cylinder 12', that is, at a position of the same height as the upper end of the baffle plate 28. In the figure, a portion A' is a cutting portion of the shroud support cylinder 12', and a portion B is a cutting portion between the riser 18 and the nozzle thermal sleeve 26a of the recirculation inlet 26.

Next, a description is made of a constitution of an integrated type module of a shroud and a jet pump used in the mounting method for core internals according to the present embodiment, with reference to FIG. 16.

The same reference numerals in FIG. 7 indicate the same parts.

A new riser brace N18a is mounted on the outer wall of a new shroud N11' to fix a new riser N18. A new diffuser N19 is fixedly secured to a ring like new baffle plate N29' at the lower end thereof. The new baffle plate N29' is formed, at a mounting portion of the new diffuser N19, with a hole through which reactor water passes. The upper end of the new diffuser N19 and the upper end of the new riser N18 are respectively secured to a new inlet mixer N17.

In the example shown in FIG. 7, the space Z is formed between the lower end N11Z of the new shroud N11 and the inner peripheral side of the new baffle plate N29, whereas in the present embodiment, the lower end of the new shroud N11' and the inner peripheral side of the new baffle plate N29' are connected by welding. Accordingly, centering between the new shroud N11' and the new baffle plat N29' is easy. Further, setting of the new diffuser N19 and the new baffle plate N29' is easy.

With the above described constitution, a new jet pump 16N comprising the new inlet mixer N17, the new riser N18, and the new diffuser N19 constitutes a module integrated with the new shroud N11' together with the new baffle plate N29'.

Next, a securing state of the new baffle plate N29 and the old baffle plate 28 will be described with reference to FIG. 17.

The new shroud N11' is connected to the shroud support cylinder 12 at a connecting portion C' by welding. The new baffle plate N29 is installed on the old baffle plate 28. The new baffle plate N29 is fixedly secured to the old baffle plate 28 at a welding portion 31' by welding. Accordingly, setting of a hole 28a of the old diffuser 28 and a hole N29a of the new baffle plate N29 is easy.

As described above, according to the present embodiment, since the new shroud, the new jet pump, and the new baffle plate for replacement are integrated into a module, and the module is carried in from the opening of a roof of the rector building, the divided carrying in of the shroud and the individual carrying in of components of the jet pump in the prior art are unnecessary to enable shortening of a term of work for replacement of core internals. Accordingly, it is possible to enhance the availability factor of a nuclear power plant.

Further, since the jet pump is integrally constituted and then carried into the reactor, which is less in assembling work within the reactor, a simple in pile shield will suffice, the number of steps for installing and disassembling an in pile shield can be considerably reduced, and a term of work in the reactor can be shortened to enable reduction in exposure dose of workers to less than a half.

The construction itself of the reactor pressure vessel need not be changed but the present embodiment can be applied to replacement of core internals of a reactor pressure vessel of the existing nuclear power plant which is already installed and being operated.

Further, in cutting and removing the old shroud and the old jet pump, the baffle plate and the shroud support leg constituting a pressure boundary are to be left by being welded and secured to the reactor pressure vessel, and the new baffle plate is fixedly secured to the old baffle plate. Therefore, processing for removing a distortion and heat treatment for removing stress and distortion are unnecessary to thereby enable shortening a term of work for replacement.

Figure 18:
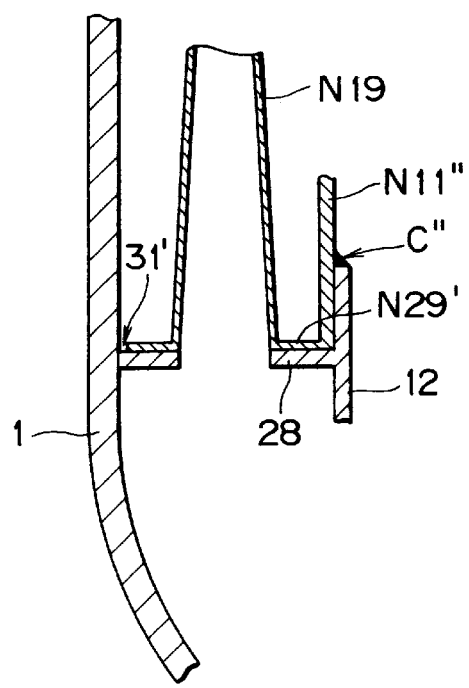
FIG. 18 is an explanatory view of a connecting state of a new shroud and a new baffle plate in the mounting method for core internals according to a third embodiment of the present invention.

Next, a mounting method for core internals according to a third embodiment of the present invention will be described with reference to FIG. 18.

The work steps of a mounting method for core internals according to the present embodiment are similar to the flow chart for steps shown in FIG. 4. In the present embodiment, the constitution of the module integrated by the new shroud, the new jet pump and the new baffle plate carried into RPV in Step S104 of FIG. 4 is different from that shown in FIG. 7.

The state of RPV1 in a state that the step of Step S100 in FIG. 4 has been terminated is similar to that shown in FIG. 5. That is, cutting is effected at a connecting portion of the shroud 11 and the shroud support cylinder 12.

Further, a constitution of an integrated type module of a new shroud and a new jet pump is similar to that shown in FIG. 16. That is, as shown in FIG. 16, the lower end of the new shroud N11' and the inner peripheral side of the new baffle plate N29' are connected by welding. It is noted that the inside diameter of the new shroud N11' is slightly larger than the outside diameter of the shroud support cylinder 12.

A securing state of a new baffle plate N29 and an old baffle plate 28 will be described with reference to FIG. 18.

The inside diameter R2 of the new shroud N11' is slightly larger than the outside diameter R1 of the shroud support cylinder 12, and the upper end of the shroud support cylinder 12 is inserted into the new shroud N11' whereby the new shroud 11' is installed.

The new shroud N11 is connected to the shroud support cylinder 12 at a connecting portion C" by welding. The new baffle plate N29 is installed on the old baffle plate 28. The new baffle plate N29 is fixedly secured to the old baffle plate 28 at a welding portion 31' by welding. Accordingly, setting of the old baffle plate 28 and the new shroud N11' is further easier.

As described above, according to the present embodiment, since the new shroud, the new jet pump, and the new baffle plate for replacement are integrated into a module, and the module is carried in from the opening of a roof of the reactor building, the divided carrying in of a shroud and the individual carrying in of components of a jet pump in the prior art are unnecessary to enable shortening of a term of work for replacement of core internals. Accordingly, it is possible to enhance the availability factor of a nuclear power plant.

Further, since the jet pump is integrally constituted and then carried into the reactor, which is less in assembling work within the reactor, a simple in pile shield will suffice, the number of steps for installing and disassembling an in pipe shield can be considerably reduced, and a term of work in the reactor can be shortened to enable reduction in exposure dose of workers to less than a half.

The construction itself of the reactor pressure vessel need not be changed but the present embodiment can be applied to replacement of core internals of a reactor pressure vessel of the existing nuclear power plant which is already installed and being operated.

Further, in cutting and removing the old shroud and the old jet pump, the baffle plate and the shroud support leg constituting a pressure boundary are to be left by being welded and secured to the reactor pressure vessel, and the new baffle plate is fixedly secured to the old baffle plate. Therefore, processing for removing a distortion and heat treatment for removing stress and distortion are unnecessary to thereby enable shortening a term of work for replacement.

Figure 21:
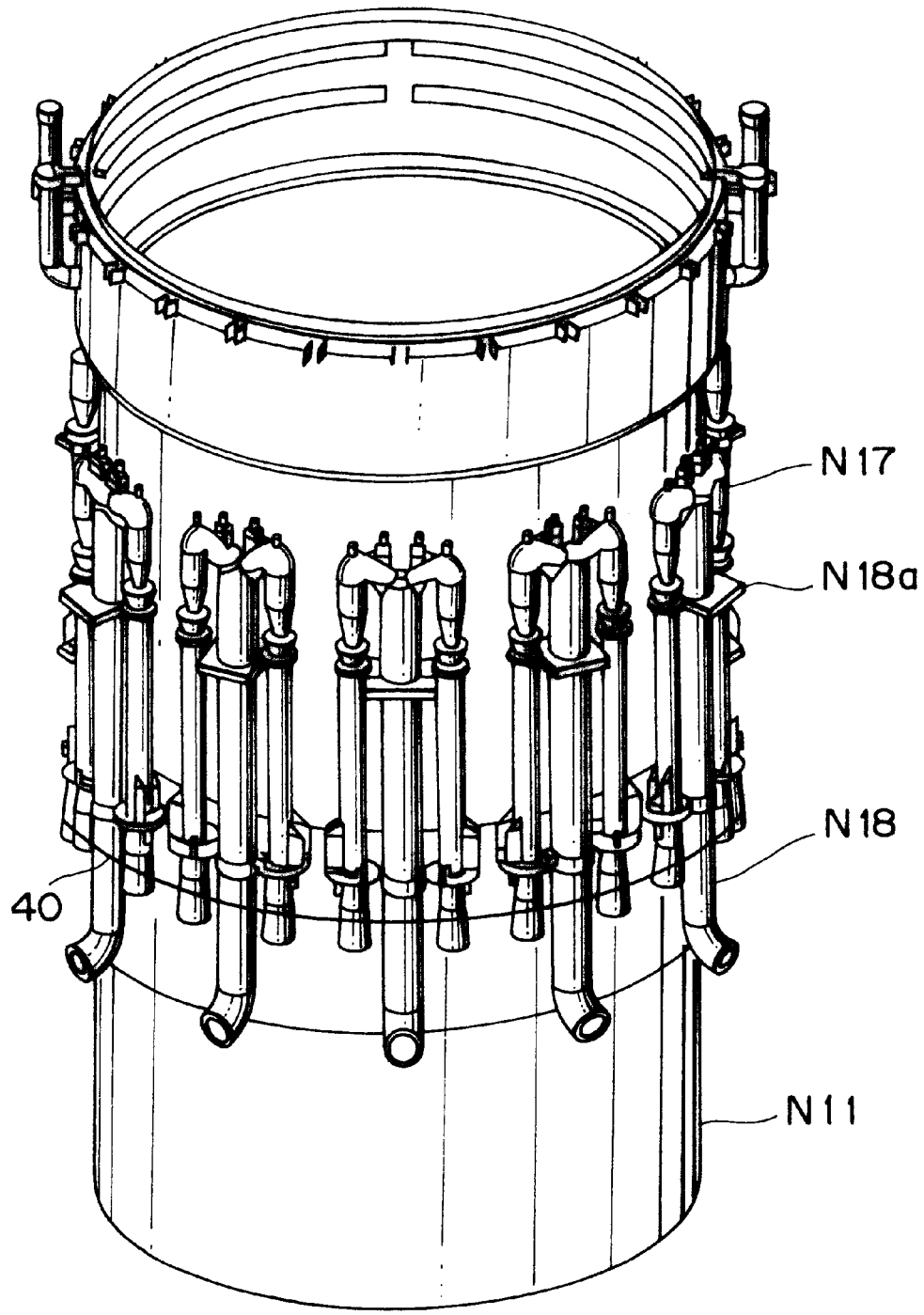
FIG. 21 is a perspective view showing a constitution of an integral type module of a shroud and a jet pump used for the mounting method for core internals according to the fourth embodiment of the present invention.

Next, a mounting method for core internals according to a fourth embodiment of the present invention will be described with reference to FIGS. 19 to 21.

First, the mounting method for core internals according to the fourth embodiment will be described with reference to FIG. 19.

In the work steps according to the present embodiment, the same steps as those shown in FIG. 4 indicate the same work steps. In the present embodiment, the work steps S204, S205, and S206 are carried out in place of Step S104, and S108 shown in FIG. 4.

Figure 19:
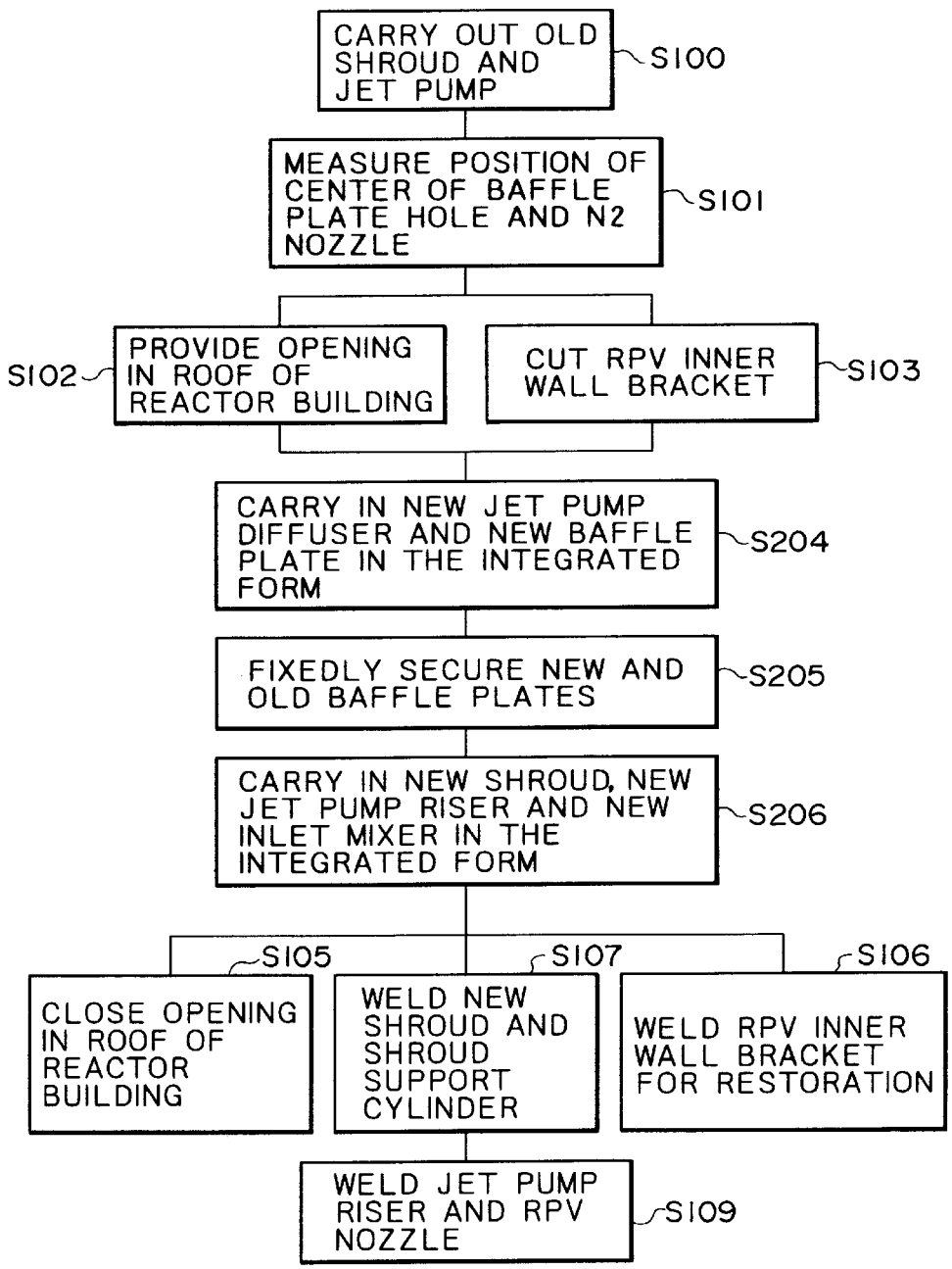
FIG. 19 is a flow chart of steps showing working steps of the mounting method for core internals according to a fourth embodiment of the present invention.

First, in Step S204 of FIG. 19, an integrated module having a new baffle plate and a new diffuser is carried into RPV through an opening 55 of a reactor building 4 by a crane 50 installed externally of the reactor building 4, similarly to those shown in FIGS. 9 and 10.

A constitution of an integrated module of a new baffle plate and a new diffuser used in the mounting method for core internals according to the present embodiment will be described with reference to FIG. 20.

A new diffuser N19 is fixedly secured to a ring like new baffle plate N29 at the lower end thereof. The new baffle plate N29 is formed, at a mounting portion relative to the new diffuser N19, with a hole through which reactor water passes.

With the above described constitution, an integrated module having the new baffle plate N29 and the new diffuser N19 is constituted.

Next, in Step 205 of FIG. 19, the new and old baffle plates are fixedly secured. That is, as shown in FIG. 13, the new baffle plate N29 is installed on the old baffle plate 28, and the new baffle plate N29 and the old baffle plate 28 are fixedly secured at a welding portion 31 by welding. Alternatively, as shown in FIG. 14, the new baffle plate 29 and the old baffle plate 28 are fixedly secured by means of a bolt 30.

Next, in Step 206 of FIG. 19, an integrated module having a new shroud, a new riser and a new inlet mixer is carried into the reactor.

Now, a constitution of an integrated type module of a shroud and a jet pump used in the mounting method for core internals according to the present embodiment will be described with reference to FIG. 21.

A new riser brace N18a is mounted on the outer wall of a new shroud N11 to fix a new riser N18. With the above mentioned construction, a new inlet mixer N17 is secured to the upper end of the new riser N18. A new jet pump comprising the new inlet mixer N17 and the new riser N18 constitutes an integrated module with the new shroud N11.

A belt 40 is mounted externally of the new riser N28. Where the integrated module having the new core shroud N11 and the new jet pump interferes with brackets such as a guide rod support bracket 31a mounted on the inner wall of RPV1 when the module is carried into RPV1, the belt 40 is tightened to move the new riser N18 toward the new shroud N11 to avoid the interference with the brackets, thus enabling carrying in the module into RPV. After carrying in, the belt 40 is removed.

Where the interference of the brackets with the integrated type module newly carried in can be avoided by using the belt 40, the aforementioned step S103 and Step S106 described later can be omitted.

This module is carried into the reactor through an opening 55 of a reactor building 4 by a crane 50 installed externally of the reactor building 4. Alternatively, the new inlet mixer N17 can be carried into the reactor with the new shroud N11 and the new riser N18 integrated, and then mounted. Where no interference with the apparatus carrying in hatch occurs, and where no short in capacity of the ceiling crane 10 of the reactor building or no short in suspending allowance of the ceiling crane 10 occurs when the integrated module having the new diffuser N19 and the new baffle plate N29, and the integrated module having the new shroud N11, the new riser N18 and the new inlet mixer N17 are carried into the reactor building 4, Step S102 and Step S105 can be omitted.

Further, the baffle plate can be divided into three parts or more to thereby enable avoidance of interference relative to the core internals wall bracket for carrying in.

As described above, according to the present embodiment, the integrated module having the new diffuser and the new baffle plate for replacement, and the integrated module having the new shroud, the new riser and the new inlet mixer are carried in through the opening of a roof of the reactor building. Therefore, the divided carrying in of a shroud and the individual carrying in of components of a jet pump in the prior art are unnecessary to enable shortening of a term of work for replacement of core internals. Accordingly, the availability factor of a nuclear power plant can be enhanced.

Further, the jet pump is also integrated and then carried into the reactor to reduce the assembling work within the reactor. Thereby, a simple in pile shield will suffice, the number of steps for installing and disassembling an in pile shield can be considerably reduced, and a term of work in the reactor can be shortened to reduce the exposure dose of workers to less than a half.

Further, the construction itself of the reactor pressure vessel need,not be changed but the present embodiment can be applied to replacement of core internals of a reactor pressure vessel of the existing nuclear power plant which is already installed and being operated.

Further, in cutting and removing the old shroud and the old jet pump, the baffle plate and the shroud support leg constituting a pressure boundary are to be left by being welded and secured to the reactor pressure vessel, and the new baffle plate is fixedly secured to the old baffle plate. Therefore, processing for removing a distortion and heat treatment for removing stress and distortion are unnecessary to thereby enable shortening a term of work for replacement.

In the above described description, the first to third embodiments are constituted by an integrated module having a new shroud, a new jet pump and a new baffle plate for replacement. The fourth embodiment is constituted by an integrated module having a new diffuser and a new baffle plate for replacement and an integrated module having a new shroud, a new riser and a new inlet mixer. Any of these embodiments are included in a concept of an integrated module having a new shroud, a new jet pump and a new baffle plate for replacement according to the present invention.

INDUSTRIAL APPLICABILITY

According to the present invention, it is possible to shorten a term of work for replacement of core internals of a reactor pressure vessel of an existing nuclear power plant to enhance the availability factor of the nuclear power plant.

What is claimed is:

1. A mounting method for core internals, comprising the steps of:

carrying an integrated module of core internals having a new core shroud, a new jet pump and a new baffle plate into a reactor pressure vessel in which an old baffle plate and an old shroud support cylinder welded and fixedly secured to the reactor pressure vessel and an old shroud support leg fixedly secured to said old baffle plate and said old shroud support cylinder are left;

fixedly securing said new baffle plate to said old baffle plate; and fixedly securing said new core shroud to said old shroud support cylinder.

2. The mounting method for core internals according to claim 1, wherein said integrated module of core internals having the new core shroud, the new jet pump and the new baffle plate is carried into said reactor pressure vessel through an opening provided in a roof of a reactor building for receiving said reactor pressure vessel.

3. The mounting method for core internals according to claim 1, wherein said new jet pump comprises a new jet pump inlet mixer, a new jet pump riser and a new jet pump diffuser;

a lower end of said new jet pump diffuser is fixedly secured to said new baffle plate; and said new jet pump riser is secured to said new shroud by a new jet pump riser brace mounted on an outer wall of said new shroud.

4. A mounting method for core internals, comprising the steps of:

cutting an old core shroud and an old jet pump from an old shroud support cylinder and an old baffle plate and carrying the old core shroud and the old jet pump out from a reactor pressure vessel;

carrying an integrated module of core internals having a new core shroud, a new jet pump and a new baffle plate into the reactor pressure vessel in which the old baffle plate and the old shroud support cylinder welded and fixedly secured to the reactor pressure vessel, and said old baffle plate and said old shroud support cylinder are left;

fixedly securing said new baffle plate to said old baffle plate; and fixedly securing said new core shroud to said old shroud support cylinder.

* * * * *